Nov. 9, 1926.
1,606,499

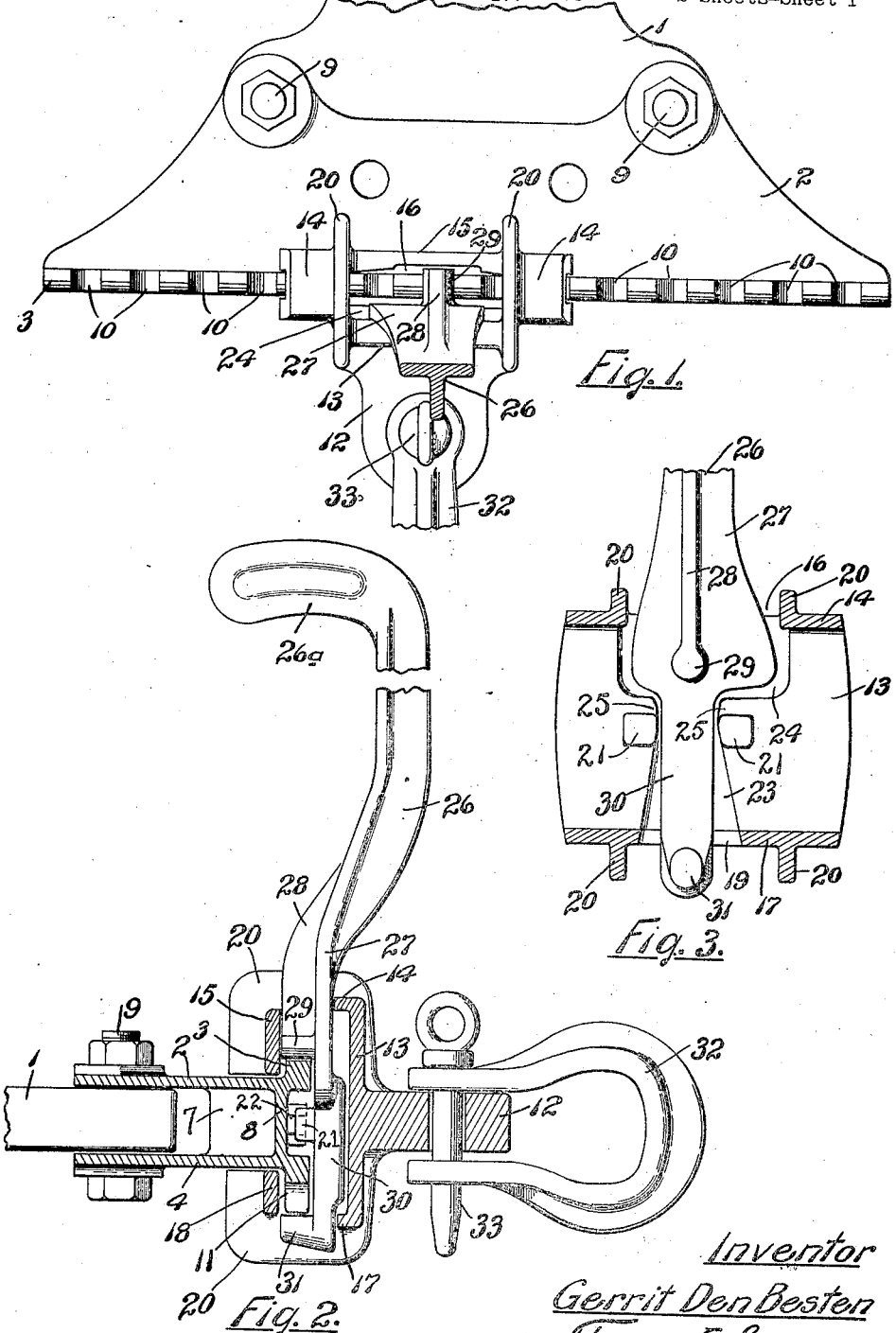

G. DEN BESTEN

MOVABLE HITCH CONNECTION

Filed Nov. 17, 1924   2 Sheets-Sheet 2

Inventor
Gerrit Den Besten
By Frank E. Liverance, Jr.
Attorney.

Patented Nov. 9, 1926.

1,606,499

UNITED STATES PATENT OFFICE.

GERRIT DEN BESTEN, OF HOLLAND, MICHIGAN.

MOVABLE HITCH CONNECTION.

Application filed November 17, 1924. Serial No. 750,233.

This invention relates to a movable hitch connection which may be used between a tractor or like draft machine and a plow or other devices or implements drawn by the machine and in connection with any suitable form of hitch device, which may be used in making the hitching connection between the devices drawn and the said movable hitch connection of this invention.

It is desirable many times to make a lateral shift of the connection between a tractor, truck or the like and the implements or other things drawn thereby. My invention is directed to the provision of a very simple and practical means whereby a lateral shift may be accomplished by the operator of a tractor without stopping movement of the tractor or without the necessity of leaving the seat thereof. It is a primary object and purpose of this invention to construct a device having the advantages stated and to make the same very simply and economically, in practice the movable hitch connection of the invention including three parts only, all of which are cast and which require substantially no machining of any character before their assembly together. A further feature of the construction is that the apparatus is amply strong to withstand the severe strains to which it is subjected in service and is also durable so that it has a long life in service.

The invention consists of novel construction and arrangement of parts for the accomplishment of the above stated ends, as well as many others not at this time stated but which will be apparent as understanding of the invention is had from the following description, taken in connection with the accompanying drawings in which, Fig. 1 is a plan view of the movable hitch connection made in accordance with my invention, the operating lever thereof being shown in horizontal section.

Fig. 2 is a vertical section taken through the hitch connection and showing the operating lever in side elevation.

Fig. 3 is a vertical section through one element of the hitch construction and showing the operating lever in rear elevation.

Like reference characters refer to like parts in the different figures in the drawings.

Figure 4:
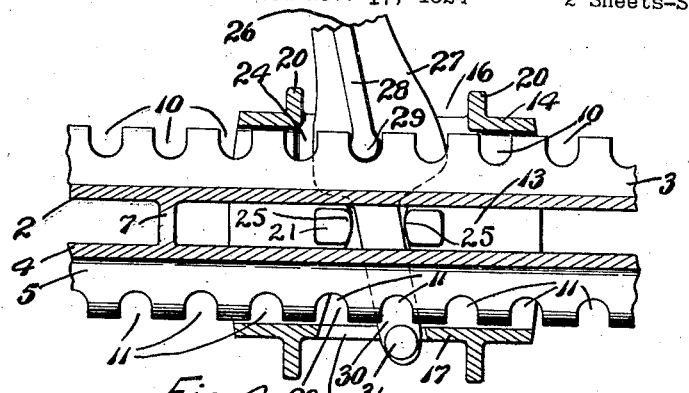
Fig. 4 is a fragmentary vertical section through the assembled hitch connection illustrating one position of the lever and the operation of laterally shifting one of the elements of the construction on the other.
Figure 5:
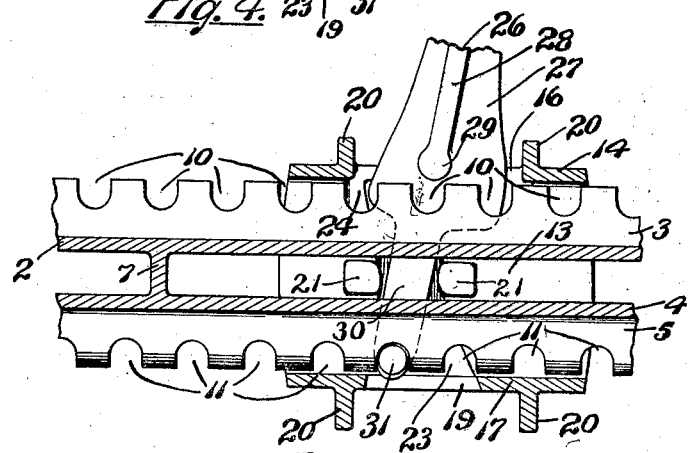
Fig. 5 is a view similar to Fig. 4 illustrating the operating lever in another position.
Figure 6:
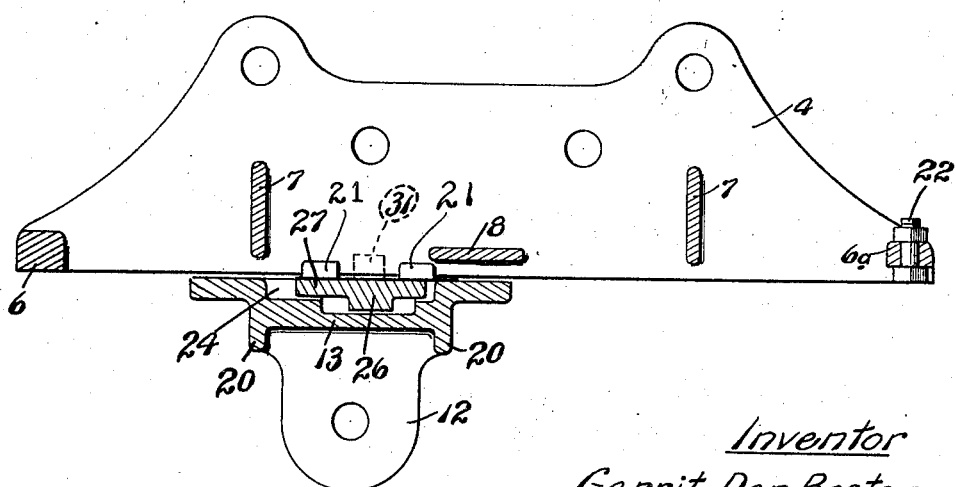
Fig. 6 is a horizontal section through the movable hitch connection.

The construction as shown, is designed for application to a tractor on which a head or draw bar 1 is located at the rear end of the tractor for the attachment of the connecting hitch used between said tractor and the implement drawn thereby. To said draw bar 1 one element or member of the movable hitch connection of my invention is attached, the same being in the form of an integral casting and including an upper horizontal plate 2 of metal with an upwardly extending leg 3 at the rear edge thereof. Below and paralleling the plate 2 is a second plate 4 formed with a downwardly extending leg 5 which lies directly below and in the same plane with the leg 3 previously noted. At their ends plates 2 and 4 are connected by integral posts 6 and 6ª. Between their ends other integral posts or webs 7 connect the plates 2 and 4 and midway between their ends a third web 8 integrally connects the two plates, said web 8 being disposed parallel to the rear edges of the member. The connection of the member thus described to the draw bar is made by bolts 9 passing through plates 2 and 4 and the end of the draw bar as shown in Figs. 1 and 2. In the upper and lower edges of the legs 3 and 5, respectively, equally spaced apart notches or recesses 10 and 11 are provided for a purpose which will later appear.

The upwardly and downwardly extending legs 3 and 5 serve as guides for the second member of the device, said second member being slidably mounted on the guides. This member includes a horizontally positioned and rearwardly extending tongue 12 disposed in the same plane with and back of the draw bar 1. At its front end it joins with an integrally cast vertical web 13 which, at its upper edge, is turned at right angles, as indicated at 14, for a short distance and then downwardly at right angles, as indicated at 15, in front of the guide 3. In the part 14 a somewhat enlarged elongated opening 16 is made for the passage of an operating lever as will be hereafter described. From the lower edge of the web 13 the metal extends at right angles as indicated at 17 under the guide 5 and is then turned upwardly at right angles, as at 18. A shorter opening 19 is cut through the part 17 for the passage of the lower end of the operating lever. This member is strengthened and reinforced by outwardly extending cast ribs 20, as shown.

From the web 13 a short lug 21 projects at each side of the recess 23, extending between the upper and lower plates 2 and 4 and so as to strike against the post 6 at the limit of its travel in one direction and adapted to pass back of the web 8 and back of the post 6ª at the opposite end of the plates 2 and 4, which post 6ª is of less thickness than post 6. This permits the said second member to be mounted upon the first member and after it is mounted a bolt 22 may be passed through the post 6ª whereby the head of the bolt serves as a stop to prohibit the lug 21 passing and thus allow a disconnection of the second member from the first member.

On the front side of the web 13 upper and lower recesses 23 and 24 in conjunction are made, the lower recess tapering upwardly from the opening 19 in the part 17, as shown in Fig. 3, and the upper recess joining therewith but being considerably wider than the recess 23. This makes two shoulders 25 one at each side the upper end of the recess 23 where it joins with the wider recess 24.

An operating lever 26 equipped with a handle 26ª at its upper end passes downwardly through the openings 16 and 19 in the second member of the device. This handle is formed with a web 27 which is widened laterally at each side at its lower end, the lower wider end of the web being received in the recess 24, heretofore described. The handle also includes an integrally formed rib 28 between its ends which is located on the front side thereof and extends downwardly through the opening 16; and at its lower end is equipped with an enlarged head 29 having a substantially cylindrical form which is adapted to seat in any one of the notches or recess 10 in the guide 3. Below the lower end of the web 27 the handle is extended downwardly, as at 30, passing in front of the guide 5 and at its lower end being equipped with a forwardly extending projection or boss 31 adapted at times to seat in any one of the recesses 11 in the guide 5.

The implement to be attached to this movable hitch connection device may be connected by any desired means, and one of the simplest means is the well known clevis 32, the clevis pin 33 passing through a vertical opening in the tongue 12. When the implement is connected to the tractor draw bar if at any time a lateral shift of one with respect to the other is desired, it is necessary merely to grasp the handle 26ª and move it to one side, as indicated in Fig. 4, whereupon the second member, slidably mounted upon the first member of the construction, will be shifted in a direction opposite to the direction of movement of the handle 26. The handle may then be lifted so as to lift the operating lever and bring the projection or boss 31 into a recess 11, this elevating the part 29 above the upper edge of the guide 3 so that on moving the handle laterally in the opposite direction the part 29 is brought above the next adjacent recess 10 whereupon the lever may be lowered so that the part 29 is received in such recess; and the projection or boss 31 lowered below the lower edge of the guide 5. This operation may be repeated indefinitely or until a lug 21 strikes against either the post 6 or the head of the bolt 22. The shoulders at 25 serve as fulcrums for the operating lever in the operation of moving the second member of the movable hitch connection laterally on the first relatively stationary member.

The movement of the slidable member on the relatively stationary guide member is in a series of steps and in the direction of the length of the guides 3 and 5. This movement of the lever 26 may be in either direction so as to shift the slidable member in either direction. The operation can be made at any time while the tractor is moving or at rest, and the handle 26ª of the lever is in a position so that it can be conveniently reached by the tractor driver and he need not leave his driver's position to operate the same. This is a matter of considerable value in devices of this character saving time and effort when the hitch connection has to be changed as when the character of the lever of the ground changes as in plowing, the location of the plow with reference to the tractor being necessarily different when the furrow is thrown down a slope than when it is thrown in the opposite direction, and still different on level ground, while the different angles of slope require different relative positions of the plow and tractor, as is evident.

The device is very simple in construction, being of three parts only, and each is a complete and integral casting in itself. All openings may be formed when the various parts of the device are cast. The construction is sure in action and serves the purposes for which it is designed perfectly. There are a large number of points of connection between the tractor and implement, that is the relative position of the tractor to the implement may be varied and changed to a great degree and over a wide range. This is a feature of considerable value in the invention. The claims define the invention which is to be considered as comprehensive of all forms of structure coming within the scope of said claims.

I claim:

1. In a device of the class described, a horizontally positioned guide means, a member slidably mounted thereon to move lengthwise thereof, and a manually operable lever engaging with the guide means and passing through said slidably mounted member and engaging with said guide means, operation of said manually operable lever serving to move the slidably mounted member along the guide means a predetermined amount.

2. In a device of the class described, a horizontally positioned guide, a member slidably mounted thereon to move lengthwise thereof, and a single operating means passing through the slidably mounted member and engaging with the guide for moving said slidably mounted member along the guide with a step by step movement and predetermined equal amounts in each step of movement, substantially as described.

3. In a device of the class described, a horizontally positioned guide means including upwardly and downwardly extending guides, each of said guides being notched at its free edge throughout its length, a member slidably mounted on the guides, a lever passing downwardly through said slidably mounted member and provided with a lug to engage any one of the recesses in the lower guide, said lugs being spaced apart a distance sufficient that when one lug is in a recess the other lug is beyond the outer edge of the adjacent guide, and interengaging means on the lever and said slidable member for moving the slidable member along the guides when the lever is turned laterally, substantially as described.

4. In a device of the class described, a horizontally positioned guide including upwardly and downwardly extending guide legs at one side thereof, each of said legs being provided with a plurality of equally spaced recesses throughout its length, a member slidably mounted on said guide legs, a lever passing through said member adjacent the guide legs and provided with spaced apart lugs adapted to fit the recesses in said upper and lower guide legs, interengaging means on said member and lever for moving the lever on lateral turning movement of the lever, and interengaging means on the guide and said slidable member for preventing disengagement thereof when the slidable member has moved to either end of the guides, substantially as described.

5. In a device of the class described, a horizontally positioned guide including upwardly and downwardly extending guide legs at one side thereof, each of said legs being provided with a plurality of equally spaced recesses throughout its length and in its free edge, a member slidably mounted on said guide legs comprising a vertical web, sections at the upper and lower edges of said web extending at right angles above and below said guide legs and then turned at right angles downwardly and upwardly respectively to embrace said guide legs, said web on its inner side being formed with upper and lower recesses joining together, the upper recess being wider than the lower recess and the lower recess flaring outwardly in a downward direction, said upper and lower sections of the slidable member having openings therethrough, and an operating handle passing downwardly through said openings and formed with a projecting lug adapted to seat in any one of the recesses in the upper leg and at its lower end formed with a lug extending in the same direction and normally positioned slightly below the lower edge of the lower leg and adapted to enter the recesses thereof, said handle also being formed with a laterally extending web widest at its lower end where it is received in the upper recess in the vertical web of the slidably mounted member, substantially as and for the purposes described.

6. In a device of the class described, a member including spaced apart horizontal upper and lower plates, the upper plate at one edge having an upwardly extending guide leg and the lower plate at the same edge having a downwardly extending guide leg, a post at each end of and integrally formed with said plates and positioned vertically between them, one of said posts being of less thickness than the other and having its outer side located back of the edges of the plates, a member slidably mounted on said guide legs and embracing the same, said member including a vertical web, a lug extending inwardly at each end of the web, said lugs being adapted to pass by the thinner post but extending inwardly far enough to be stopped by the thicker post, means for shifting said slidable member along the guide legs, and a detachable element connected to said thinner post having a part adapted to project in the path of movement of said lugs on the web whereby, after the slidable member has been mounted in position it is stopped for disassociation from the first member, substantially as described.

In testimony whereof I affix my signature.

GERRIT DEN BESTEN.